United States Patent [19]

Inoue

[11] Patent Number: 4,839,878
[45] Date of Patent: Jun. 13, 1989

[54] APPARATUS FOR CONTROLLING THE WRITING OF DATA IN DISK SECTORS

[75] Inventor: Ryuichi Inoue, Tokyo, Japan
[73] Assignee: NEC Corporation, Tokyo, Japan
[21] Appl. No.: 166,939
[22] Filed: Mar. 11, 1988

[30] Foreign Application Priority Data

Mar. 11, 1987 [JP] Japan ................................. 62-56306

[51] Int. Cl.$^4$ .............................................. G11B 7/00
[52] U.S. Cl. ....................................... 369/54; 369/32; 369/58
[58] Field of Search ....................... 369/53, 54, 32, 43, 369/47, 56, 57, 58; 360/25, 31, 53, 48

[56] References Cited

U.S. PATENT DOCUMENTS 4,546,462 10/1985 Koishi et al. ......................... 369/53
4,768,181 8/1988 Ichinose et al. ...................... 369/54

Primary Examiner—Robert L. Richardson
Attorney, Agent, or Firm—Sughrue, Mion, Zinn, Macpeak & Seas

[57] ABSTRACT

A disk control device for controlling the positioning of an optical disk having address sections in each of which a plurality of identical track addresses and a plurality of identical sector addresses are written. Data are written in a sector specified by a designated track address and a designated sector address when the result of comparison of the designated track address for starting writing and track addresses read out of an optical disk shows coincidence of the designated track address and any of the track addresses read out and, at the same time, the result of comparison of the designated sector address for starting writing and sector addresses read out of the disk shows that one of the sector addresses is identical with the designated sector address, and when at least one of the results of comparison of the designated track address and the track addresses written in the address sections of the individual sectors which are defined in one track is representative of coincidence. This allows data to be written in the sectors without forcibly leaving any of the sectors empty or non-written. Even if the address section of any of the sectors is scratched after data have been written therein, those data can be successfully read out only if the track addresses written in the address sections of the other sectors of the same track is coincident with the designated track address.

1 Claim, 5 Drawing Sheets

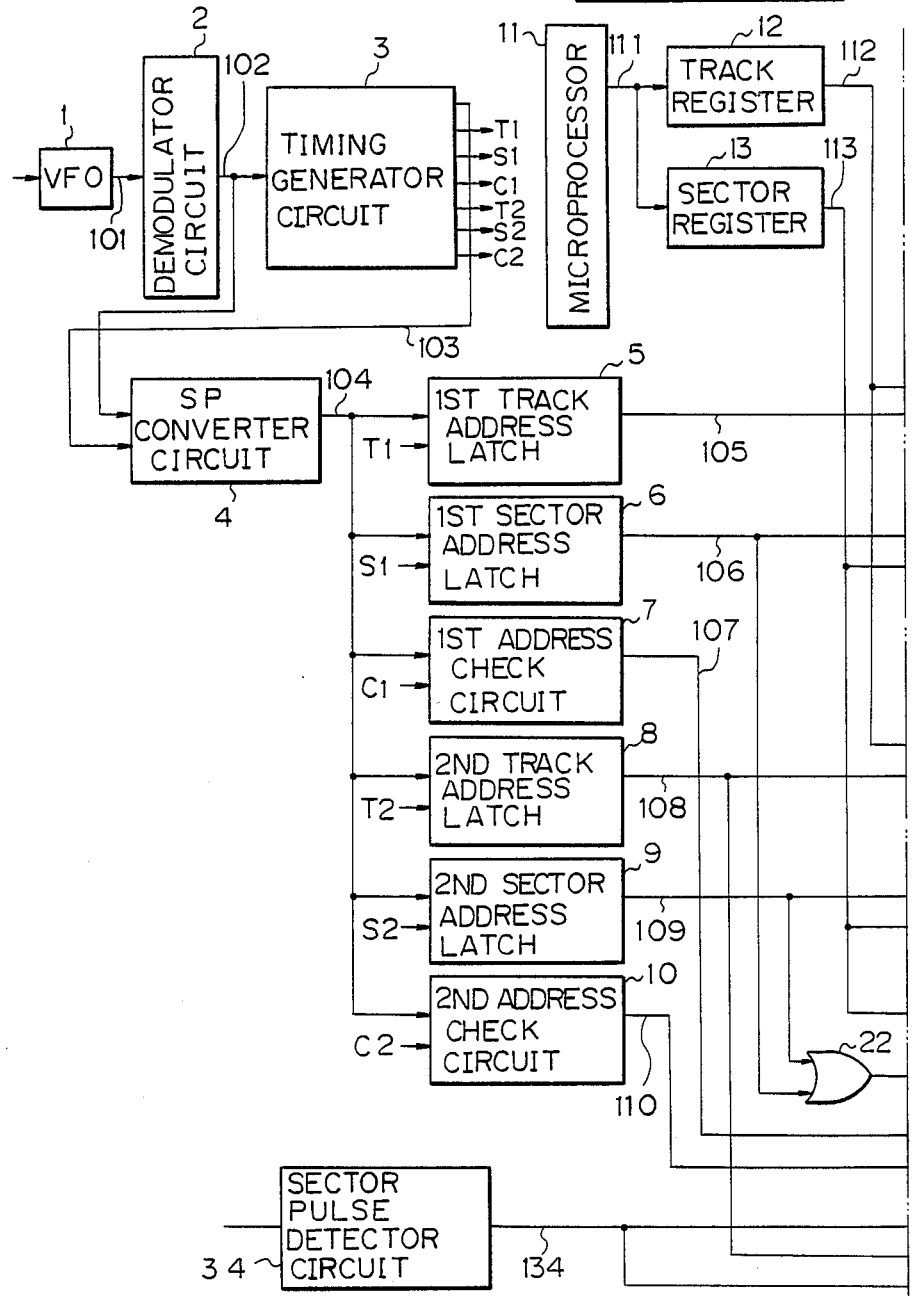

APPARATUS FOR CONTROLLING THE WRITING OF DATA IN DISK SECTORS

BACKGROUND OF THE INVENTION

The present invention relates to a disk control device and, more particularly, to a disk control device for controlling the positioning of an optical disk having address sections in each of which a plurality of identical track addresses and a plurality of identical sector addresses are written.

A disk control device of the type described is customarily constructed to control the positioning of an optical disk on the basis of the result of comparison of track addresses and sector addresses which are preformated on the disk and written in address sections of the individual sectors with a particular address for starting writing data, as disclosed in U.S. Pat. No. 4,638,472. Specifically, data are written when m of each of N sector addresses and N track addresses (N>m) which are preformated on an optical disk are coincident with a designated address. If none of the addresses is coincident with the designated address, data are written in an alternative sector by leaving that sector empty.

A problem with the above-described prior art disk control device is that even if data are successfully written in any sector under the coincidence of all the track and sector addresses, a scratch produced in the address section associated with that sector after data writing would prevent the disk from being positioned in the event of reading out the data. Another problem arises from the fact that data cannot be written in a sector unless the track and sector addresses assigned to that sector are coincident with an address for starting writing. Specifically, assuming that data were written in an address or sector other than the address or sector coincident with the address for starting writing, i.e., alternative address or sector, whether the sector of that address is purely empty or forcibly left empty because data could not be written therein has to be determined at the time of reading by tracing back to the alternative sector. Such a decision consumes a disproportionate period of time.

SUMMARY OF THE INVENTION

It is, therefore, an object of the present invention to provide a disk control device which allows data to be written without forcibly leaving any sector empty and allows them to be read out even if an address section associated with a full sector is scratched.

It is another object of the present invention to provide a generally improved disk control apparatus.

A disk control device for writing and reading data out of sectors which are preformated on a disk and have address sections in each of which a plurality of identical track addresses and a pluratlity of identical sector addresses are written of the present invention comprises track address comparing means for comparing a designated track address for starting writing data and the track address, sector address comparing means for comparing a designated sector address for starting writing data and the sector address, sector-by-sector track address comparing means for comparing the track addresses stored in storage means and written in the address sections of the individual sectors which are defined in one track of the disk and the designated track address, and control means for controlling the track address comparing means, sector address comparing means and sector-by-sector track address comparing means such that the data are written in any of the sectors which has the address section having the designated address and designated sector address therein when a result of comparison outputted by the track address comparing means shows coincidence of one of the plurality of track addresses of the address section and the designated track address, and when a result of comparison outputted by the sector-by-sector track address comparing means is representative of coincidence.

BRIEF DESCRIPTION OF THE DRAWINGS

The above and other objects, features and advantages of the present invention will become more apparent from the following detailed description taken with the accompanying drawings in which:

FIGS. 1(A) and 1(B) are a schematic block diagrams of a disk control device embodying the present invention;

DESCRIPTION OF THE PREFERRED EMBODIMENT

Figure 1B:
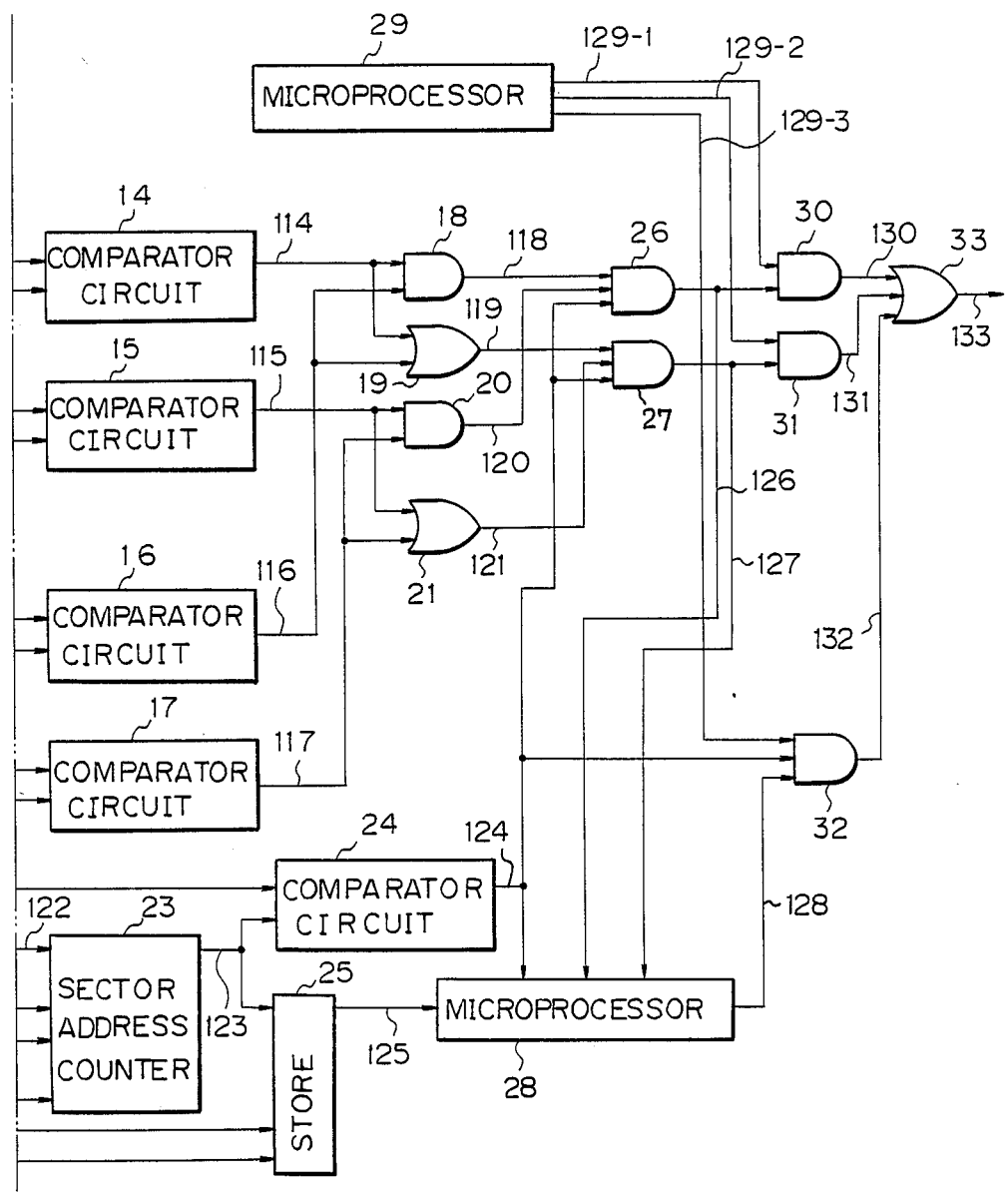

Referring to FIG. 1 of the drawings, a disk control device embodying the present invention is shown in a block diagram. As shown, the device includes a variable frequency oscillator (VFO) 1 which discriminates data and clock and delivers its output 101 to a demodulator circuit 2. The demodulator circuit 2 demodulates the data of the VFO output 101 and then applies data 102 to a timing generator circuit 3 and a serial-to-parallel (SP) converter circuit 4. Upon detecting a signal indicative of the beginning of a preformated data section, the timing generator circuit 3 generates timings T1, S1, C1, T2, S2 and C2 for latching track addresses, sector addresses and cyclic redundancy check (CRC) codes. The timings T1 to C1 and T2 to C2 are individually fed to a first track address latch circuit 5, a first sector address latch circuit 6, a first address check circuit 7, a second track address latch circuit 8, a second sector address latch circuit 9, and a second address check circuit 10. Further, the timing generator circuit 3 applies an SP conversion signal 103 to the SP converter circuit 4. The SP converter circuit 4 converts bit serial data into byte parallel data in response to the data input 102 and the SP conversion signal 103. The byte parallel data 104 outputted by the SP converter circuit 4 are individually routed to the first track address latch circuit 5, first sector address latch circuit 6, first address check circuit 7, second track address latch circuit 8, second sector address latch circuit 9, and second address check circuit 10.

Supplied with the byte parallel data 104 and timing T1, the first track address latch circuit 5 latches a first track address which is read out of an optical disk, not shown, while feeding the first track address to a comparator circuit 14 over a line 105. The first sector address latch circuit 6 to which the byte parallel data 104 and timing S1 are applied latches a first sector address read out of the optical disk and delivers the first sector address 106 to a comparator circuit 15 as well as to an OR gate 22. The first address check circuit 7 supplied with the byte parallel data 104 and timing C1 applies CRC to the first track address and first sector address which have been read out of the optical disk. If the result of CRC is free from errors, the circuit 7 delivers a first address check signal 107 which is a (logical) ONE to a sector address counter 23. The second track address latch circuit 8, like the circuit 5, feeds a second track address 108 to a comparator 16 and a store 25. The second sector address latch circuit 9, like the circuit 6, applies a second sector address 109 to a comparator 17 and the OR gate 22. Further, the second address check circuit 10, like the circuit 7, delivers a second address check signal 110 which is a ONE to the sector address counter 23 if the result of CRC applied to the second track address and second sector address is free from errors.

A mircoprocessor 11 designates a track address and a sector address to start writing data. These track address and sector address are respectively loaded in a track register 12 and a sector register 13 via a line 111. The comparator circuit 14 compares the first track address 105 outputted by the first track address latch circuit 5 and the track address 112 outputted by the track register 12, delivering a first track address coincidence signal 114 to an AND gate 18 and an OR gate 19. Comparing the first sector address 106 from the first sector address latch circuit 6 and the sector address 113 from the sector register 13, the comparator circuit 15 applies a first sector address coincidence signal 115 to an AND gate 20 and an OR gate 21. The comparator 16 comparing the second track address 108 from the second track address latch circuit 8 and the track address 112 from the track register 12 produces a second track address coincidence signal 116 which is fed to the AND gate 18 and OR gate 19. Further, the comparator circuit 17 comparing the second sector address 109 from the second sector address latch circuit 9 and the sector address 113 from the sector register 13 produces a second sector address coincidence signal 117, the signal 117 being routed to the AND gate 20 and OR gate 21.

The AND gate 18 ANDs the first track address coincidence signal 114 from the comparator 14 and the second track address coincidence signal 116 from the comparator 16, feeding the resulting AND to an AND gate 26. Specifically, when both the result of comparison of the first track address 105 and the designated track address 112 and that of comparison of the second track address 108 and the designated track address 112 are positive, the AND gate 18 produces a ONE as a result signal 118. The OR gate 19 ANDs the first track address coincidence signal 114 from the comparator circuit 14 and the second track address coincidence signal 116 from the comparator 16, feeding the AND to an AND gate 27. Specifically, when both the result of comparison of the first track address 105 and the designated track address 112 and that of comparison of the second track address 108 and the designated track address 112 are representative of coincidence, the OR gate 19 produces a ONE as a result signal 119. The AND gate 20 ANDs the first sector address coincidence signal 115 from the comparator 15 and the second sector address coincidence signal 117 from the comparator 17, delivering the AND to an AND gate 26. Specifically, when both the result of comparison of the first sector address 106 and the designated sector address 113 and the result of comparison of the second sector address 109 and the designated sector address 113 are positive, the AND gate 20 outputs a ONE as a result signal 120.

On the other hand, the OR gate 21 ORs the first sector address coincidence signal from the comparator 15 and the second sector address coincidence signal 117 from the comparator 17, the resulting OR being fed to an AND gate 27. Specifically, when either the result of comparison of the first sector address 105 and the designated sector address 113 or that of comparison of the second sector address 109 and the designated sector address 113 is representative of coincidence, the OR gate produces a ONE as a result signal 121. The OR gate 22 ORs the first sector address 106 and the second sector address 109, applying the OR or result signal 122 to the sector address counter 23.

The sector address counter 23 initializes the first sector address 106 or the second sector address 109 when the first address check signal 107 or the second address check signal 110 associated with the address 106 and 109, respectively, shows no CRC error. Incrementing the initial value in response to every sector pulse, the counter 23 applies a count 123 to a comparator 24 and the store 25. In response, the comparator 24 compares the designated sector address 113 and the count 123 to apply a sector coincidence signal 124 to the AND gates 26 and 27, an AND gate 32, and a microprocessor 28. Addressed by the count 123, the store 25 writes the second track address 108 timed to the sector pulses while feeding the content written in to the microprocessor 28 as read data 125.

The AND gate 26 ANDS the result signals from the AND gates 18 and 20 and the sector coincidence signal 124 from the comparator 24, the resultng AND being fed to the store 28 and an AND gate 30. Specifically, the AND gate 26 produces a ONE on its output 126 only when three different conditions are satisfied at the same time: that the first and second track addresses 105 and 108 are each coincident with the designated track address 112, that the first and second sector addresses 106 and 109 are each coincident with the designated sector address 113, and that the count 123 and designated sector address 113 are coincident. The AND gate 27 ANDs the result signals 119 and 120 from the OR gates 19 and 21, respectively, and the sector coincidence signal 124 from the comparator 24, applying the AND to the microprocessor 28 and an AND gate 31. Specifically, the AND gate 27 produces a ONE on its output only when three different conditions are satisfied at the same time: that either the first or the second track address 105 or 108 is coincident with the designated track address 112, that either the first or the second sector address 106 or 109 is coincident with the designated sector address 113, and that the count 123 is coincident with the designated sector address 113.

Supplied with the sector coincidence signal 124 and result signals 126 and 127, the microprocessor 28 functions to sense the positioning conditions of the individual sectors. If the sector coincidence signal 124 only is ONE, the microprocessor 28 reads the track addresses out of the store 25 to compare them with the designated track address 112 and, if any one of the former is coincident with the latter, applies a ONE or enable signal 12 to the AND gate 32. A microprocessor 29 determines conditions for the coincidence of addresses and feeds positioning indication signals 129-1, 129-2 and 129-3 to the AND gates 30, 31 and 32, respectively. The microprocessors 11, 28 and 29 are interconnected by a system bus, not shown.

The AND gate 30 produces AND of the result signal 126 from the AND gate 26 and the positioning indication signal 129-1 from the microprocessor 29, the AND being applied to an OR gate 33. Specifically, a ONE appears on an output 130 of the AND gate 30 when both the result signal 126 from the AND gate 26 and the positioning indication signal 129-1 from the miroprocessor 29 are ONE. This condition shows that both the first and second track addresses 105 and 108 are coincident with the designated track address 112, that the first and second sector addresses 106 and 109 are coincident with the designated sector address 113, and that the count 123 is coincident with the designated sector address 113. The AND gate 31 produces AND of the result signal 127 from the AND gate 27 and the positioning indication signal 129-2 from the miroprocessor 29, the AND being fed to the OR gate 33. Specifically, a ONE appears on an output 131 of the OR gate 33 when both the result signal 127 from the AND gate 27 and the positioning indication signal 129-2 from the microprocessor 29 are ONE. This is representative of a condition wherein one of the first and second track addresses 105 and 108 is coincident with the designated track address 112, one of the first and second sector addresses 106 and 109 is coincident with the designated sector address 113, and the count 123 is coincident with the designated sector address 113.

The AND gate 32 ANDs the sector coincidence signal 124 from the comparator 24, the enable signal 128 from the microprocessor 28, and the positioning indication signal 129-3 from the microprocessor 29, the AND being fed to the OR gate 33. Specifically, a ONE appears on an output 132 of the AND gate 32 when both the sector coincidence signal 124 from the comparator 24, the enable signal 128 from the microprocessor 28, and the positioning indication signal 129-3 from the microprocessor 29 are ONE. This condition shows that the count 123 outputted by the sector address counter 113 is coincident with the designated sector address 113, and that some track address lodged in the store 25 is coincident with the designated track address 112. The OR gate 33 produces AND of the result signals 130, 131 and 132 from the AND gates 30, 31 and 32, respectively, and delivers the resulting AND as a positioning end signal 133. This implies that a ONE appears on the output 133 of the OR gate 33 if at least one of the address coincident conditions determined by the microprocessor 29 is satisfied.

Further included in the disk control device of FIG. 1 is a sector pulse detector circuit 34 responsive to sector marks which are assigned to the individual sectors written in an optical disk. Every time the circuit 34 detects a sector mark, it delivers a sector pulse 134 to the address counter 23 and store 25.

Figure 2:
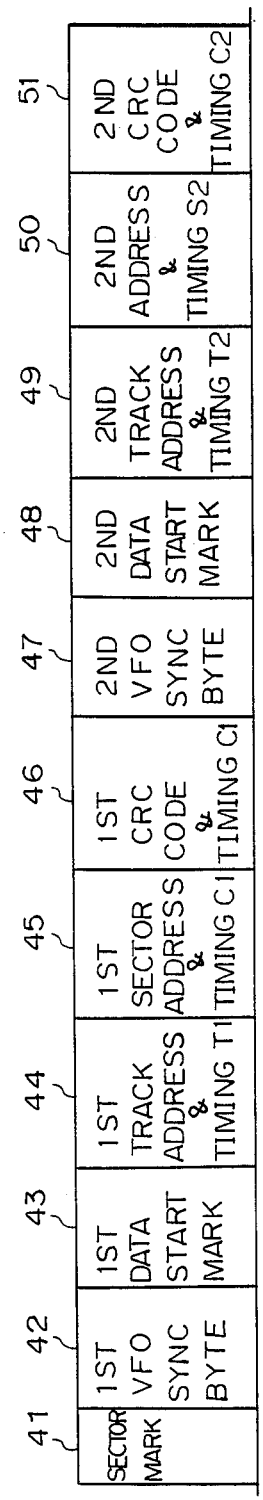
FIG. 2 shows an address section of sectors which is preformated on an optical disk applicable to the device of FIG. 1.

Referring to FIG. 2, there is shown an address section of sectors and preformated on an optical disk which is applicable to the device of FIG. 1. As shown, the address section is made up of a sector mark 41, a first VFO synchronizing byte 42, a first data start mark 43, a first track address portion 44, a second sector address portion 45, a first CRC code portion 46, a second VFO synchronizing byte 47, a second data start mark 48, a second track address portion 49, a second sector address portion 50, and a second CRC code portion 51. The first track address portion 44 has the first track address 105 and timing T1, the first sector address portion 45 has the first sector address 106 and timing S1, and the first CRC code portion 46 has the first CRC code and timing C1. The second track address portion 49 has the second track address 108 and timing T2, the second sector address portion 50 has the second sector address 109 and timing S2, and the second CRC code portion 51 has the second CRC code and timing C2. The first and second addresses are identical with each other, and so are the first and second sector addresses.

Figure 3A:
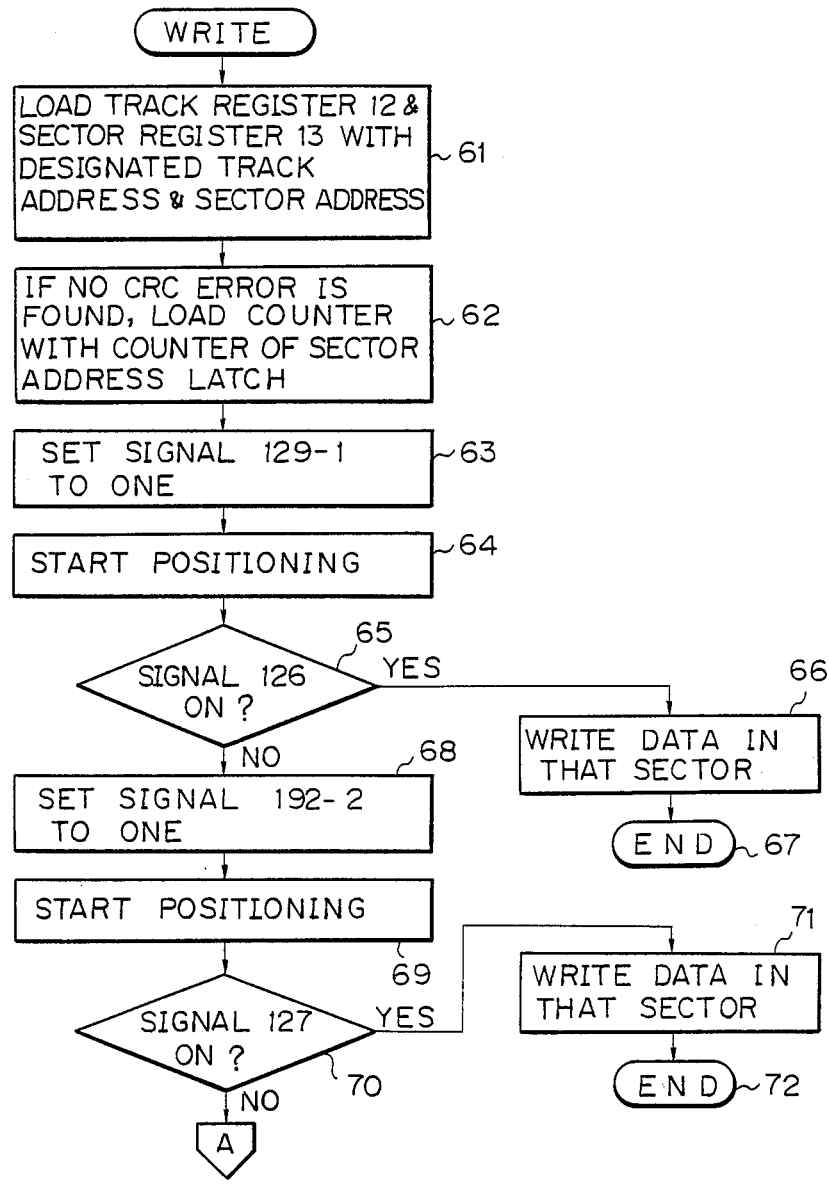
FIGS. 3A and 3B are flowcharts demonstrating the operation of the device as shown in FIG. 1.

The operation of the disk control device having the construction of FIG. 1 and used with the address section of FIG. 2 will be described with reference to FIGS. 3A and 3B. To write data in an optical disk, the microprocessor 11 sets a track address and a sector address to be loaded in the track register 12 and sector register 13, respectively (FIG. 3A, step 61). At this instant, the address section of a sector preformated on the optical disk is read out to apply data to the first track address latch circuit 5, first sector address latch circuit 6, first address check circuit 7, second track address latch circuit 8, second sector address latch circuit 9, and second address check circuit 10. One of the values lodged in the first and second sector address latch circuits 6 and 9 which is free from CRC errors is loaded in the sector address counter 23 as an initial value (FIG. 3A, step 62).

The microprocessor 29 sets up conditions for the coincidence of addresses, makes the positioning indication signal 129-1 ONE, and decides whether the address coincidence conditions are satisfied with the AND gate 26 via the AND gate 30 (FIG. 3A, step 63). Specifically, by making the positioning indication signal 129-1 ONE, the microprocessor 29 determines whether both the first and second track addresses 105 and 108 are coincident with the designated track address 112, whether both the first and second sector addresses 106 and 109 are coincident with the designated sector address 113, and whether the count 123 is coincident with the designated sector address 113. If these conditions are satisfied, positioning on the optical disk is started (FIG. 3A, step 64). If the result signal 126 outputted by the AND gate 26 is ONE, the AND gate 30 applies a ONE to the OR gate 33 (FIG. 3A, step 65) which in turn outputs the positioning end signal 133. Then, data is written in a particular sector which is specified by the designated track address 112 and designated sector address 113 (FIG.3A, step 66), whereby the writing operation is completed (FIG. 3A, step 67).

Conversely if the result signal 126 outputted by the AND gate 26 is ZERO, the AND gate 30 delivers a ZERO to the OR gate 33 as well as to the microprocessor 28 (FIG. 3A, step 65). In response, the microprocessor 28 notifies the microprocessor 29 of the ZERO output of the AND gate 30 via the system bus so that the microprocessor 29 sets up next conditions for address coincidence. Specifically, the microprocessor 29 produces a ONE on its output 129-2 to see the address coincidence conditions associated with the AND gate 27 via the AND gate 31 (FIG. 3A, step 68). These address coincidence conditions are that one of the first and second track addresses 105 and 108 be coincident with the designated track address 112, that one of the first and second sector addresses 106 and 109 be coincident with the designated sector address 113, and that the count 123 be coincident with the designated sector address 113. Then, positioning on the optical disk is stated (FIG. 3A, step 69). If the result signal 127 from the AND gate is ONE, the AND gate 31 applies a ON to the OR gate 33 (FIG. 3A, step 70) which in turn produces a positioning end signal 133. Data are written in a particular sector which is specified by the designated track address 112 and designated sector address 113 (FIG. 3A, step 71), and the writing operation is ended (FIG. 3A, step 72).

If the result signal 127 outputted by the AND gate 27 is ZERO, the AND gate 31 delivers a ZERO to the OR gate 33 as well as to the microprocessor 28 (FIG. 3A, step 70). The microprocessor 28 informs the microprocessor 29 of the ZERO output of the AND gate 31 via the system bus, causing the latter to set up the next address coincidence conditions. This time, the microprocessor 29 turns the positioning indication signal 129-3 to ONE and sees the address coincidence conditions associated with the sector coincidence signal 124 from the comparator 24 and enable signal 128 from the microprocessor 28 by means of the AND gate 32 (FIG. 3B, step 73). This initiates positioning on the optical disk 15 (FIG. 3B, step 74). First, when the sector coincidence signal 124 outputted by the comparator 24 is ZERO (FIG. 3B, step 75), the count 123 of the sector address counter 23 is not coincident with the designated sector address 113 and, therefore, it is decided that the sector address counter 23 and comparator 24 have failed, i.e., hardware error (FIG. 3B, step 76). Then, the reading operation is ended due to the abnormal condition (FIG. 3B, step 77).

Figure 3B:
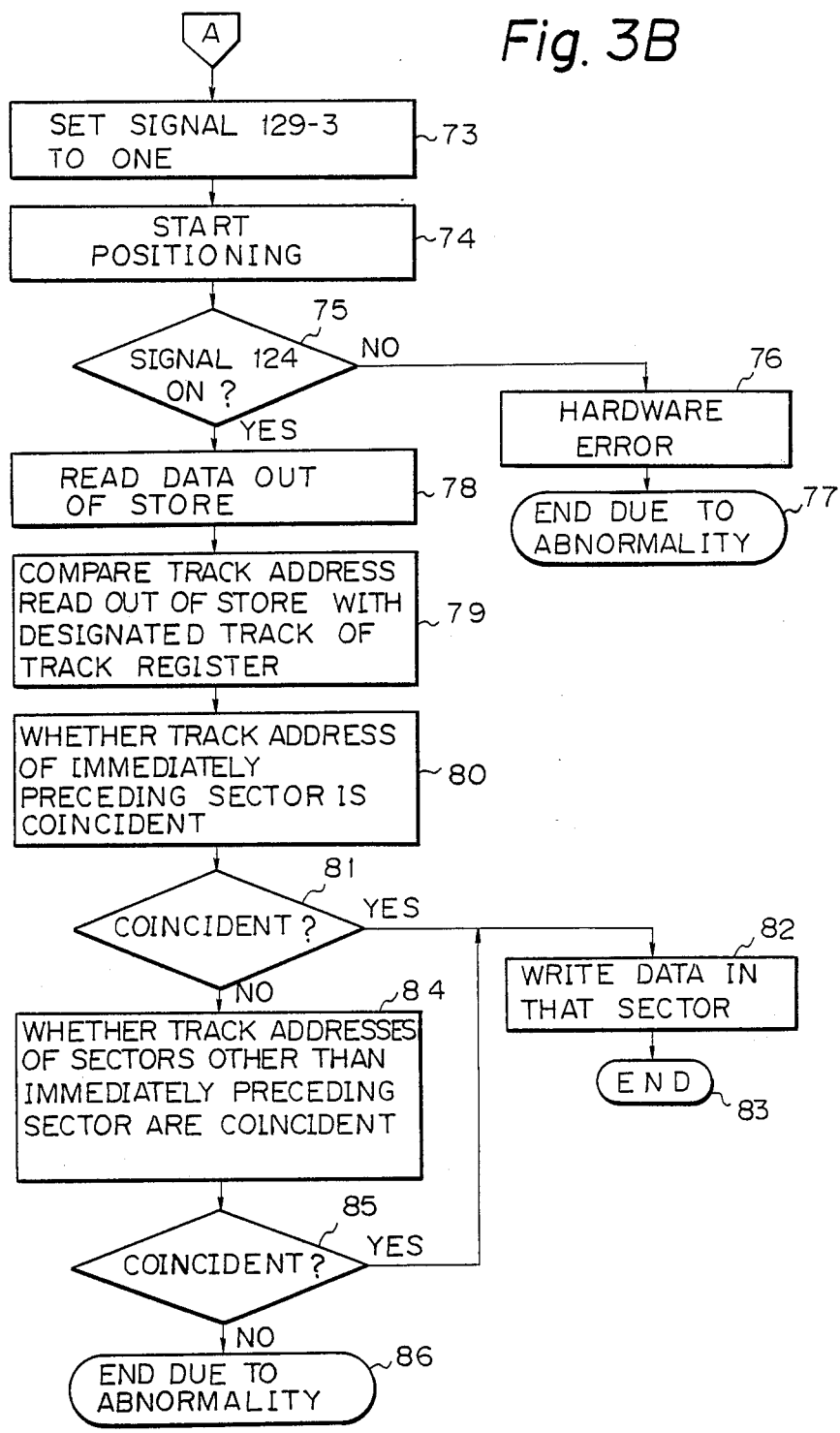

If the sector coincidence signal 124 from the comparator 24 is ONE (FIG. 3B, step 75), the track address stored in the store 25 is read out (FIG. 3B, step 78) and compared with the designated track address 112 by the microprocessor 28 (FIG. 3B, step 79) to see if the track address of a sector just before the sector which has been read out of the optical disk is coincident with the designated track address 112 (FIG. 3B, step 80). If it is coincident (FIG. 3B, step 81), the AND gate 32 delivers a ONE to the OR gate 33 which in turn outputs a positioning end signal 133. Data are written in a particular sector which is designated by the designated track address 112 and designated sector address 113 (FIG. 3B, step 82), whereupon the writing operation is ended (FIG. 3B, step 83).

If the track address of the immediately preceding sector does not agree with the designated track address 112 (FIG. 3B, step 81), whether any of the track addresses written in the address sections of sectors other than the immediately preceding sector is coincident with the designated track address 112 is determined (FIG. 3B, step 84). If any of them agrees with the designated track address 112 (FIG. 3B, step 85), the AND gate 32 delivers a ONE or the OR gate 33 which in turn produces a positioning end signal 133. Then, the data is written in a particular sector which is designated by the designated track address 112 and designated sector address 113 (FIG. 3B, step 82), the writing operation thus being ended (FIG. 3B, step 83). Conversely if none of them is coincident with the designated track addresses 112 (FIG. 3B, step 85), the operation is ended due to the abnormal condition (FIG. 3B, step 86). Specifically, the microprocessor 29 makes the positioning indication signal 129-3 ONE to decide whether the count 123 of the sector address counter 23 is coincident with the designated sector address 113 and whether any of the track addresses stored in the store 25 is coincident with designated track address 112. If any of them is coincident with the designated track address 112, data is written in a sector which is specified by the designated track address 112 and designated sector address 113 while, if none of them is coincident with the designated track address, the writing operation is ended due to the abnormal condition.

By the procedure stated above, positioning is accomplished by any of the methods so that erroneous positioning is eliminated. In addition, data can be written in those sectors which have been read out of an optical disk without forcibly leaving any of them empty.

In summary, it will be seen that the present invention provides a disk control device which allows data to be written in a sector specified by a designated track address and a designated sector address when the result of comparison of the designated track address for starting writing and track addresses read out of an optical disk shows coincidence of the designated track address and any of the track addresses read out and, at the same time, the result of comparison of the designated sector address for starting writing and sector addresses read out of the disk shows that one of the sector addresses is identical with the designated sector address, and when at least one of the results of comparison of the designated track address and the track addresses written in the address sections of the individual sectors which are defined in one track is representative of coincidence. This allows data to be written the sectors without forcibly leaving any of the sectors empty. Even if the address section of any of the sectors is scratched after data have been written therein, those data can be successfully read out only if the track addresses written in the address sections of the other sectors of the same track are coincident with the designated track address.

Various modifications will become possible for those skilled in the art after receiving the teachings of the present disclosure without departing from the scope thereof.

What is claimed is:

1. A disk control device for writing and reading data out of sectors which are preformatted on a disk and have address sections in each of which a plurality of identical track addresses and a plurality of identical sector addresses are written, comprising:

track address comparing means for comparing a designated track address for starting writing data and said track address;

sector address comparing means for comparing a designated sector address for starting writing data and said sector address;

sector-by-sector track address comparing means for comparing said track addresses stored in storage means and written in said address sections of said individual sectors which are defined in one track of said disk and said designated track address; and control means for controlling said track address comparing means, said sector address comparing means and said sector-by-sector track address comparing means such that said data are written in any of said sectors which has said address section having said designated address and said designated sector address therein when a result of comparison outputted by said track address comparing means shows coincidence of one of said plurality of track addresses of said address section and said designated track address, and when a result of comparison outputted by said sector-by-sector track address comparing means is representative of coincidence.

* * * * *